Jan. 26, 1971   H. M. BAKER, JR., ET AL   3,559,176
METHOD AND SYSTEM FOR LOCATING FAULTS IN UTILITY
ELECTRICAL POWER SYSTEMS
Filed Nov. 25, 1966

INVENTOR
HUGH M. BAKER, JR.
JOHN R. CRESSEY

United States Patent Office 3,559,176
Patented Jan. 26, 1971

3,559,176
METHOD AND SYSTEM FOR LOCATING FAULTS IN UTILITY ELECTRICAL POWER SYSTEMS
Hugh M. Baker, Jr., Washington, D.C., and John R. Cressey, Hyattsville, Md., assignors to HB Engineering Corporation, Silver Spring, Md., a corporation of Maryland
Filed Nov. 25, 1966, Ser. No. 596,850
Int. Cl. H04q 9/00
U.S. Cl. 340—163
4 Claims

ABSTRACT OF THE DISCLOSURE

The electrical fault location method and system pertains to the monitoring of a distribution system for cyclically varying power within a determined frequency range. An interrogation frequency of a given frequency is mixed in a passive transponder with a second signal having a frequency indicative of the power frequency at a monitored point in the distribution system. A filter receives and passes the mixed frequency if the second signal is indicative of a power frequency within the determined frequency range of the cyclically varying power for the distribution system.

---

Figure 1:
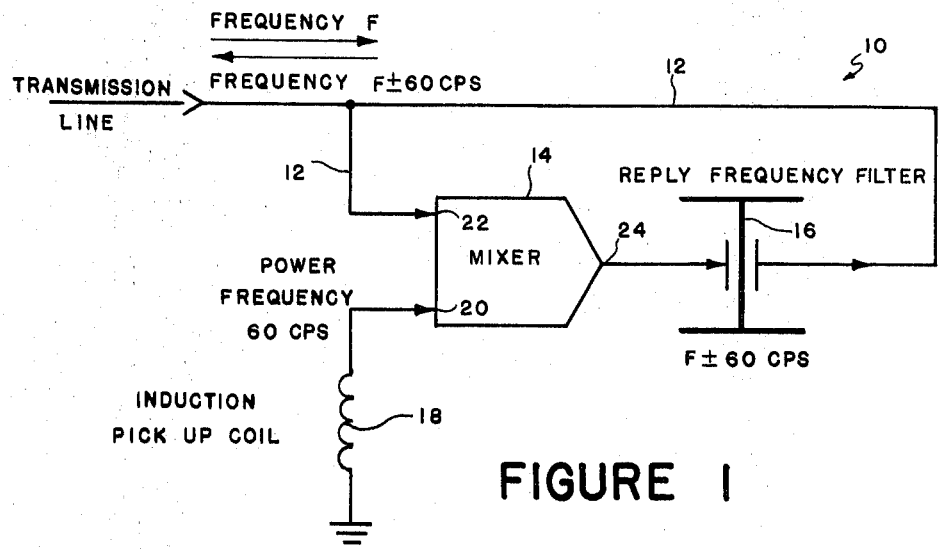

This invention relates to a method and system for rapidly, readily and inexpensively locating any faults, failures, variances, presence or absence of a power source at a definite certain vicinity or location in a distribution system.

It is desired by utility companies to have a method and system for automatically determining where, throughout the distribution system, electrical power is being delivered and where it is not. With such data available at a central station the utility company is able to locate the source of the trouble by the pattern of the power loss.

It is an object of this invention to provide a method and system by which a utility company, or the like may locate a fault, failure, absence, presence or variance in a power distribution system.

It is also an object of this invention to provide a method and system having passive transponding devices located at key points or at certain vicinities throughout the distribution system with the transponding devices being responsive to faults, failures, absence, presence or variance in the power being transmitted in the distribution system.

Other objects and important features of this invention will be apparent from a study of the specification following taken with the drawing, which together show, illustrate, describe and disclose preferred embodiments or modifications of the invention and what is now considered to be the best mode of practicing the principles thereof.

Figure 2:
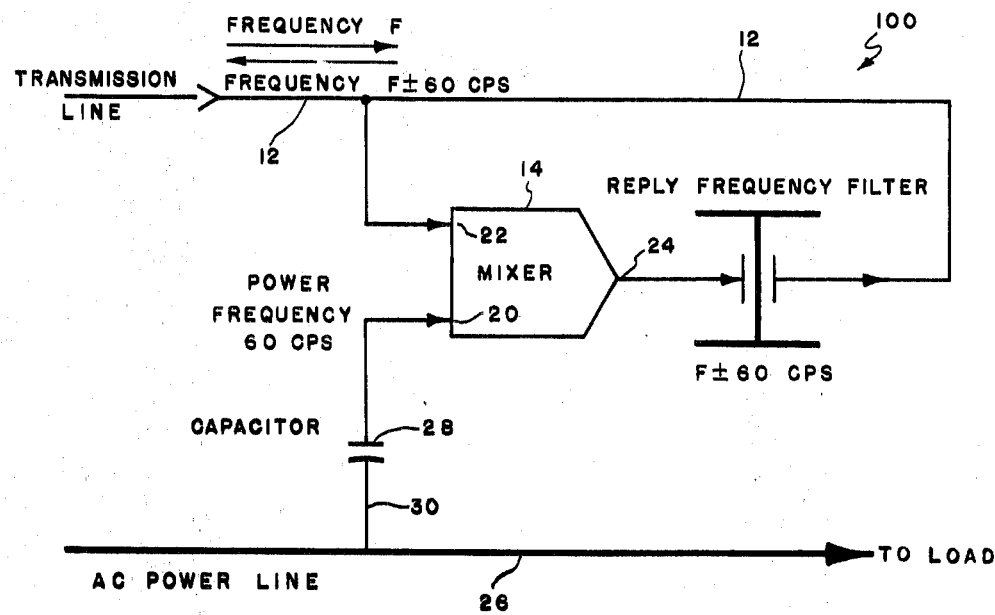

In the drawing:

FIG. 1 is a schematic illustration of the preferred embodiment or modification of the method and system for detecting, locating or in other ways identifying a fault, variance, presence, absence, failure or the like in a power distribution system, and FIG. 2 is another embodiment or modification of the method and system as illustrated in FIG. 1.

Attention is now directed to FIG. 1 of the drawing wherein there is illustrated a passive transponding device 10 which may be located at any selected or desirable key points, locations or certain vicinities in the distribution system of a utility company, or the like so that the transponding devices 10 may confirm, identify or in some way indicate the presence, absence, fault, variance or failure etc. in the power of the distribution system. For example, a 60 cycle power is somewhat conventional in a utility distribution system such as an electrical power company and as illustrated, the novel method and system of this invention is shown as confirming, locating or in some ways identifying the presence, absence, failure, fault, loss or some type of undesirable condition in a utility type electrical power distribution system employing 60 cycle power.

It is to be understood that the given frequency, that is the 60 cycle power as illustrated, may be any typical AC power frequency such as 50, 400, etc. which is on command from a central interrogation station X. It is to be understood that the employment of the 60 cycle power is for the purpose of illustration only.

The central interrogation station X is in communication with the transponding devices 10 and information is communicated therebetween by means 12 such as leased low quality lines, existing subscriber telephone lines, or the like which may be connected through normal telephone switching arrangements.

The passive transponding device 10 comprises an analog multiplier circuit or mixer 14 which is in communication with a passive filter or resonator 16 together with structural means 18 in the form of an induction pickup coil that is located in the area or vicinity which is to be interrogated.

For the purpose of this description and disclosure and as illustrated schematically in the drawing, the passive filter 16 may take the form of an electromechanical filter with piezoelectric input and output devices as shown in application Ser. No. 565,430 filed July 15, 1966. It is to be understood that the specific type of resonator or filter is not critical and that the method and system of this invention will function and operate with any of the known other suitable type filters or resonators as that described above.

One input 20 of the mixer 14 is connected to the output of the structural means 18 so that as long as the given frequency to be interrogated such as 60 c.p.s. power, is in the vicinity of the structural means 18, a signal corresponding to the given frequency to be interrogated will be present at the output of the coil which defines the structural means 18.

A second input 22 of the mixer 14 is connected to the transmission line 12. The output 24 of the mixer 14 will be the combination of the given frequency taken from the structural means 18 and any interrogation signal F that may be passed into the mixer 14 through the transmission line 12. It is to be understood that the combination of the given frequency and the interrogation frequency may be either the sum or difference between the given frequency and the interrogation frequency.

By selecting the resonant frequency of the filter 16 so that it is substantially equal to the combination of the given frequency and the interrogation frequency there is created a reply signal which may be placed back onto the transmission line 12 and passed to the central station X whereat it may be received.

Accordingly, if the given frequency, by way of example the 60 c.p.s., is absent, lost or in some way varied in the vicinity of the location of the structural means 18 which is the area that is being interrogated only the interrogation frequency will be present at the output of the mixer 14 so that the filter 16 will not respond to and consequently there will be no reply frequency present on the transmission line 12 to be received by the central station X.

By using the existing subscriber telephone or telegraph lines as the transmission lines 12 would require scanning each of the passive transponding units 10 singly from predetermined sequence, or by using multiple outgoing telephone or telegraph lines from the utility central station X to decrease the time required to make a determination or to locate the power, fault, failure, variance, absence etc.

If a single series loop were connected through a large number of transponder units 10, or if by leased pairs all transponders 10 are connected simultaneously to the utility central station, each individual transponder 10 may be made to respond to a distinct interrogation frequency and to produce a distinct reply tone. The number that may be put on any given transmission line 12 simultaneously is only limited by the frequency selectivity of the filters 16 incorporated and the avoidance of overlap and interfering harmonics. In any case, by this means connection and power condition information may be made to large numbers of transponder units 10 almost immediately.

Because of the use frequency translation, it is not necessary to operate below the cutoff band pass characteristics of telephone or telegraphic lines. For example, if an interrogation frequency of 2000 c.p.s. is used, the reply frequency will be either 1940 c.p.s. or 2060 c.p.s., both well within optimum band pass characteristics of conventional telephone or telegraph lines. The 60 c.p.s. separation is adequate for relatively inexpensive filters. At no time is 60 c.p.s. being introduced into the transmission line by this system.

Attention is now directed to FIG. 2 of the drawing wherein there is illustrated another embodiment or modification of the arrangement of the passive transponding device wherein there is illustrated and disclosed another arrangement or embodiment of a passive transponding device 100 which employs certain similar elements to the transponding device 10 such as the transmission line 12, mixer, 14, filter or resonator 16, outputs 20, 22 and 24.

The transponding device 100 differs from the device 10 in that in the device 100 a power line 6 defines the certain vicinity whereat it is desirable to determine whether a frequency for a given value is present or exists.

The transponding device 100 comprises a structural means 28 in the form of a capacitor which is connected between the power line 26 and the input 20 by a communication line 30 so that any given frequency which may exist on the power line 26 may be sensed through the capacitor 28, lines 30 by reason of the combination of the given frequency with any interrogation frequency that may be passed to the mixer 14 through the transmission line 12.

The transponding device 100 has the disadvantage that it requires a connection between the lines 26 and 30 which must be made by an electrician while the transponding device 10 may be completely installed by a telephone workman.

In the transponding device 10, the only connections which are necessary are connections to the communication line 12 and there is no requirement or need of any power source.

Further, the total power consumed via the induction pickup is in the low microwatt region.

We claim as our invention:

1. An electrical fault location system for monitoring an electrical power distribution line for the distribution of cyclically varying power within a determined frequency range at locations remote from a central location without the use of local power supply units at said remote locations comprising interrogation means for providing an interrogation signal of a first frequency, a transmission line connected to said interrogation means for transmitting said interrogation signal, means responsive to the occurrence of cyclically varying power at a given remote location in said electrical power distribution line to provide a second signal having a second frequency indicative of the frequency of said cyclically varying power at said given remote location, said means for providing said second signal operating to develop said second signal directly from the power on said electrical power distribution line, and passive transponding means connected to receive said interrogation and second signals, said transponding means including mixer means connected to said transmission line to receive said interrogation signal and to said second signal providing means to receive said second signal, said mixer means operating to provide a mixed output signal of a third frequency determined by the combination of the frequencies of said interrogation and second signals, and filter means operative to pass said mixed output signal only when said mixed output signal is formed by said interrogation signal and a second signal having a frequency within the determined frequency range of said cyclically varying power, said filter means including an electromechanical resonator connected to receive said mixed output signal from said mixer and to provide an output signal to said transmission line for passage thereby back to said interrogation means, said resonator being tuned to pass only a predetermined mixed signal frequency and to block all other frequencies.

2. The electrical fault location system of claim 1 wherein said transponding means includes a plurality of transponders for monitoring a plurality of locations in said power distribution system, said interrogation means operating to provide to each such transponder an interrogation signal to each such transponder which differs in frequency from the interrogation signals provided to the remaining transponders.

3. The electrical fault location system of claim 1 wherein said means responsive to the occurrence of cyclically varying power includes a sensing coil positioned in inductive relationship with said power distribution system.

4. The electrical fault location system of claim 1 wherein said means responsive to the occurrence of cyclically varying power includes a capacitor connected between said power distribution system and said mixer means.

References Cited

UNITED STATES PATENTS

| | | | |
|---|---|---|---|
| 3,263,217 | 7/1966 | Boosman | 340—171X |
| 2,574,458 | 11/1951 | Atkinson et al. | 340—163 |
| 2,685,684 | 8/1954 | Atkinson et al. | 340—310X |
| 2,724,821 | 11/1955 | Schweitzer, Jr. | 340—310X |
| 2,806,184 | 9/1957 | Carter | 340—163X |
| 3,428,896 | 2/1969 | Schweitzer, Jr. | 340—207X |

DONALD J. YUSKO, Primary Examiner

U.S. Cl. X.R.

340—310